United States Patent [19]
Hoáng

[11] Patent Number: 6,006,373
[45] Date of Patent: Dec. 28, 1999

[54] SYSTEM FOR COLLECTING AND DISPOSING OF AIRCRAFT GALLEY WASTE

[75] Inventor: Thao Hoáng, Rockton, Ill.

[73] Assignee: EVAC International Oy, Helsinki, Finland

[21] Appl. No.: 09/109,985

[22] Filed: Jul. 2, 1998

[51] Int. Cl.[6] .................................................. E03D 11/00
[52] U.S. Cl. ........................................ 4/431; 4/321; 4/435
[58] Field of Search ............................... 4/431, 435, 321, 4/347, 209 R, 210, 211, 219, 629, 650, 679

[56] References Cited

U.S. PATENT DOCUMENTS

| | | | |
|---|---|---|---|
| 4,357,719 | 11/1982 | Badger et al. ............................... | 4/316 |
| 4,865,631 | 9/1989 | Stroby et al. .............................. | 55/163 |
| 5,369,811 | 12/1994 | Serre ........................................... | 4/213 |
| 5,732,417 | 3/1998 | Pondelick et al. ......................... | 4/427 |
| 5,813,061 | 9/1998 | Tornqist ..................................... | 4/431 |

*Primary Examiner*—Henry J. Recla
*Assistant Examiner*—Huyen Le
*Attorney, Agent, or Firm*—Marshall, O'Toole, Gerstein, Murray & Borun

[57] ABSTRACT

A galley waste collection system for a passenger transport vehicle having a vacuum sewage collection system includes a basin for receiving galley waste and a normally-closed discharge valve connected between the outlet opening of the basin and the sewer pipe of the vacuum sewage collection system. A flush element is responsive to operation by a user of the galley waste collection system to issue a discharge command, and a control unit operates selectively in response to the discharge command to open the discharge valve.

14 Claims, 2 Drawing Sheets

SYSTEM FOR COLLECTING AND DISPOSING OF AIRCRAFT GALLEY WASTE

BACKGROUND OF THE INVENTION

This invention relates to a system for collecting and disposing of galley waste in a passenger transport aircraft.

Many passenger transport aircraft currently in service have vacuum toilet systems, in which toilet waste is transported to a waste-holding tank by pressure difference between the aircraft cabin and a vacuum sewer.

A passenger aircraft may include a galley area for food and beverage service. Food service in a passenger transport aircraft is usually accomplished using trays, each bearing the utensils and food items for a complete meal, which are loaded into the aircraft at the start of a flight. The trays are themselves accommodated in special purpose trolleys, each of which may contain several tens of trays. At the start of a food service interval, a flight attendant rolls the trolleys along the aisle and dispenses the trays, with their meals, to the passengers. At the end of the food service interval, the flight attendant retrieves the trays, with unconsumed food items, from the passengers, puts the trays back in the trolley, and rolls the trolley back to the galley area. The flight attendant disposes of liquid waste through a basin which is located in the galley and has an outlet connected through a gray water interface valve to the aircraft drain mast. The liquid from the basin accumulates upstream of the valve, and when the head of the liquid upstream of the valve reaches a certain threshold level, the interface valve opens and the liquid passes through the interface valve to the drain mast and is dumped out of the aircraft.

Solid food waste should not be disposed of through the galley basin because solid objects in the food waste can interfere with closing of the gray water interface valve, with the result that liquid can continue to flow to the drain mast when the valve is nominally in its closed condition. This flow of liquid, which is typically mainly water, may be at a sufficiently low rate that the liquid freezes in the drain mast. Consequently, the drain mast is blocked and the basin is no longer functional. In this case, there is a possibility of liquid backing up upstream of the blockage in the drain mast, even as far as the galley basin, contaminating the galley and causing a public health hazard.

In the case of an aircraft equipped with a vacuum toilet system, the flight attendant may dispose of solid food waste by flushing down one of the toilet bowls of the vacuum toilet system, so that the waste is collected in the holding tank. This is not an optimum solution to the problem of disposal of solid food waste because it interferes with use of the toilet compartment by the passengers. Also, there is a possibility of contamination of the galley by waste containers that have been taken into the toilet compartment.

It is an object of the invention to provide a galley waste disposal system by which solid food waste can be disposed of in a sanitary and convenient manner.

SUMMARY OF THE INVENTION

In accordance with a first aspect of the invention there is provided a galley waste collection system for a passenger transport vehicle having a vacuum sewage collection system including a sewage holding tank, a vacuum sewer, and a vacuum device for providing a substantial partial vacuum in the sewer pipe, the galley waste collection system comprising a basin for receiving galley waste, the basin having an outlet opening, a normally-closed discharge valve connected between the outlet opening of the basin and the sewer pipe, a flush element responsive to operation by a user of the galley waste collection system to issue a discharge command, and a control unit operable selectively in response to the discharge command to open the discharge valve.

In accordance with a second aspect of the invention there is provided a galley waste collection system for a passenger transport vehicle having a vacuum sewage collection system including a sewage holding tank, a vacuum sewer, and a vacuum device for providing a substantial partial vacuum in the sewer pipe, the galley waste collection system comprising a basin for receiving galley waste, the basin having an outlet opening, a waste receptacle for receiving waste from the outlet opening of the basin, the waste receptacle having a primary collection cavity positioned for receiving waste from the outlet opening of the basin and also having a secondary collection cavity which is separated from the primary collection cavity by an overflow barrier, a primary discharge valve connected between the primary collection cavity of the waste receptacle and the sewer pipe, a secondary discharge valve connected between the secondary collection cavity of the waste receptacle and the sewer pipe, and a control unit responsive to a discharge command to open the primary discharge valve.

In accordance with a third aspect of the invention there is provided a galley waste collection system for a passenger transport vehicle having a vacuum sewage collection system including a sewage holding tank, a sewer pipe, and a vacuum device for providing a substantial partial vacuum in the sewer pipe, the galley waste collection system comprising a basin for receiving galley waste, the basin having an outlet opening, a waste receptacle for receiving waste from the outlet opening of the basin, a discharge valve connected between the waste receptacle and the sewer pipe, a control unit operable selectively in response to a discharge command to open the discharge valve, and an odor control pipe connected between the sewer pipe and the waste receptacle for drawing a continuous flow of air from the waste receptacle.

BRIEF DESCRIPTION OF THE DRAWINGS

For a better understanding of the invention, and to show how the same may be carried into effect, reference will now be made, by way of example, to the accompanying drawings, in which.

In the several figures of the drawings, like reference numerals designate corresponding elements.

DETAILED DESCRIPTION

Figure 1:
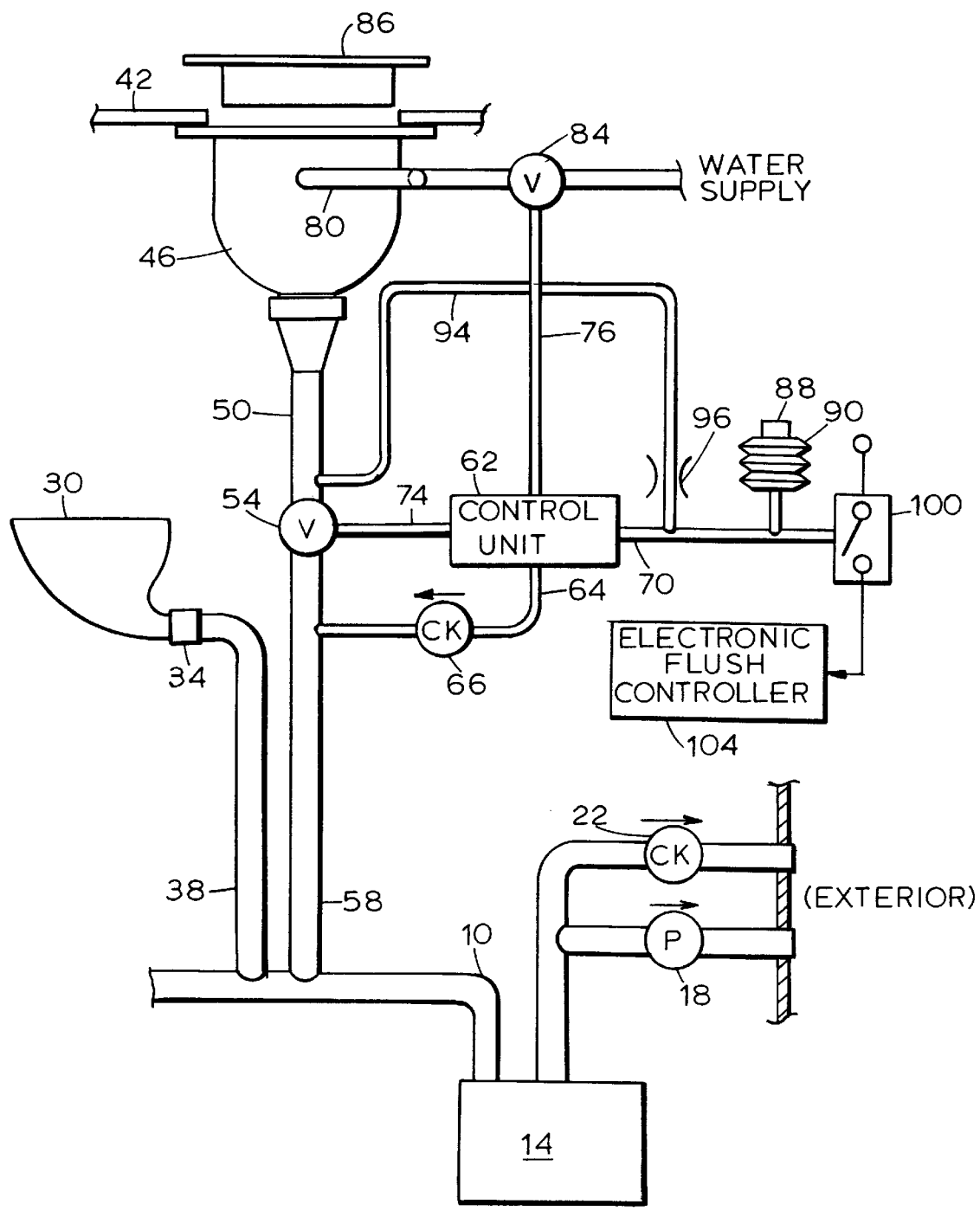
FIG. 1 is a partial schematic view of a passenger transport aircraft equipped with a first galley waste disposal system in accordance with the present invention.

The passenger transport aircraft shown in FIG. 1 has a vacuum sewer system for serving flushable appliances installed in the aircraft. The vacuum sewer system includes a vacuum sewer 10 and a waste-holding tank 14. A blower 18 is connected between the tank 14 and the exterior of the aircraft, and a check valve 22 is connected in parallel with the blower. The check valve allows the pressure in the vacuum sewer 10 to be lower than external atmosphere pressure and ensures that the pressure in the vacuum sewer does not exceed external atmospheric pressure by more than the threshold pressure difference required to cause flow through the check valve. The blower maintains a considerable partial vacuum (typically about 0.3 to 0.5 bar below cabin pressure) in the sewer pipe. Operation of the blower is controlled by a blower controller (not shown) which receives a pressure difference signal dependent on the pressure difference between the vacuum sewer and the aircraft cabin. If the pressure difference falls below a lower limit value, the blower operates to reduce the pressure in the vacuum sewer and restore the pressure difference.

The blower controller also receives an external pressure or altitude signal. At an altitude above about 16,000 feet (about 4,900 m), the difference between cabin pressure and external atmospheric pressure is sufficient for operating the vacuum sewer system and accordingly the blower controller disables the blower.

The flushable appliances in the aircraft include toilet bowls, only one of which, designated 30, is shown in FIG. 1. The toilet bowl 30 has an outlet opening which is connected through a normally-closed discharge valve 34 to a branch line 38 of the vacuum sewer. When a user of the toilet bowl presses a flush button (not shown) a flush control unit associated with the toilet bowl executes a flush operation in which it opens and then closes the discharge valve 34. When the valve 34 opens, the pressure difference between the aircraft cabin and the vacuum sewer 10 forces the contents of the toilet bowl into the vacuum sewer by way of the discharge valve 34 and the branch line 38.

FIG. 1 also illustrates a food service counter 42 in a galley of the passenger transport aircraft. A galley waste disposal basin 46 is fitted in the counter and has a drain pipe 50. A normally-closed discharge valve 54 is connected between the drain pipe 50 and a branch line 58 of the vacuum sewer 10.

A pneumatic flush control unit (or activator) 62 has a vacuum port connected through a tube 64 and a check valve 66 to the branch line 58 of the vacuum sewer. The flush control unit 62 also has a sensor port connected to a tube 70 and two control ports connected to tubes 74 and 76 respectively. In the normal state of the flush control unit, the control ports are isolated from the vacuum port, but when the flush control unit is activated by an increase in pressure at the sensor port, the flush control unit initiates an operating sequence in which it connects the vacuum port to the control ports in a selected order and each for a selected time. The flush control unit may be of the kind that is sold by Envirovac Inc. of Rockford, Ill. under the designation FCU T-90.

The discharge valve 54 is vacuum operated and includes a valve actuator (not shown) which is connected to the tube 74.

A spray ring 80 is fitted around the basin 46 and has nozzles projecting into the basin. A normally-closed rinse water supply valve 84 is connected between the spray ring and the aircraft's potable water supply system, for supplying water under pressure to the spray ring when the rinse water supply valve is open. The rinse water supply valve 84 is vacuum operated and includes a valve actuator (not shown) which is connected to the tube 76. Use of a spray ring instead of a conventional faucet having a spout projecting above the counter 42 is advantageous because it allows a shroud 86 having a flat top surface to be placed in the basin and thereby enlarge the effective surface area of the counter. A spray ring provides adequate water in an aircraft galley, where it is not usual to use the galley basin for washing utensils or containers and the principal need is to keep the galley free of contamination.

A flush button 88 is mounted in the galley, for example on a wall adjacent the counter 42. The flush button may include, for example, a bellows 90 surrounding a chamber which is connected through the tube 70 to the sensor port of the flush control unit 62.

Just upstream of the valve 54, the drain pipe 50 of the basin is connected by a backup sensor tube 94 and a throttle 96 to the tube 70. The tube 94 includes an upward extending leg, which traps an air cushion between the outlet pipe of the basin and the flush control unit and prevents liquid from the drain pipe 50 reaching the sensor port.

In normal use of the galley, a flight attendant may deposit food waste (solid, soft and liquid) in the basin 46. Since the valve 54 is normally closed, it prevents the waste from passing from the drain pipe 50 to the branch line 58. The flight attendant may press the flush button 88 to initiate opening of the valve 54. When the attendant presses the button 88, compression of the bellows 90 generates a pressure increase at the sensor port. The throttle 96 prevents dissipation of the pressure increase through the tube 94.

The flush control unit 62 responds to the increase in pressure at the sensor port by initiating its operating sequence. Accordingly, the rinse water valve 84 and the discharge valve 54 each open at a selected time after start of the operating sequence and each remains open for a selected time. The contents of the basin 46 and drain pipe 50 are forced into the vacuum sewer, and the interior of the basin is rinsed by rinse water sprayed from the nozzles. The rinse water valve and the discharge valve both close, completing the operating sequence.

If the discharge valve 54 remained closed as more and more waste was deposited in the basin 46, the waste would accumulate upstream of the valve 54 and eventually reach the basin and could contaminate the galley. It is therefore desirable that the flight attendant should press the flush button 88 each time he deposits waste in the basin 46. However, there is a possibility that the flight attendant will not press the flush button. When the level of liquid in the outlet pipe 50 increases, the pressure of air in the tube 94 increases. The pressure of air in the tube 94 is communicated to the sensor port of the flush control unit through the throttle 96 and the tube 70. When the pressure at the sensor port reaches a predetermined level, the flush control unit responds by initiating the operating sequence even though the flush button has not been pressed. This protects against overflow of the basin and contamination of the galley in the event that the flight attendant does not press the flush button.

Typically, the outlet opening of the basin has a diameter of about 2.5 cm and so liquid waste, solid waste smaller than 2.5 cm and soft waste having a maximum dimension rather greater than 2.5 cm can be disposed of through the basin 46. Larger solid items may be collected in a garbage can and disposed of separately. The size of the outlet opening is selected on the basis of the aircraft plumbing, to prevent articles that might block the branch pipe 58 or the vacuum sewer 10 from being drawn past the outlet opening of the basin. Of course, depending on the plumbing of the aircraft, the outlet opening of the basin may be greater than 2.5 cm and may be as large as 5 cm.

Depending on the plumbing of the aircraft, there may be a separate liquid disposal system connected to the aircraft's drain mast through a gray water interface valve. This system would typically have a basin having a 5 mm strainer. Objects trapped by the strainer would be disposed of either through the basin 46 or collected in a garbage can for separate disposal.

Regulations issued by the United States Public Health Service (USPHS) favor rinsing of the basin 46 each time the basin is emptied. This is accomplished by virtue of the fact that the rinse water supply valve 84 opens each time the discharge valve 54 opens. However, opening of the valve 54 is not dependent on availability of potable water. Thus, if the potable water supply should be exhausted, the flush control unit 62 will still carry out its operating sequence in response to an increase in pressure at the sensor port even though no water is supplied to the basin 46 when the valve 54 opens.

It is desirable in an aircraft that the number of utilities, e.g. potable water and electric power, that must be routed to each subsystem in the aircraft, e.g. galley waste disposal system and toilet bowls, be kept to a minimum. In the system described above, the motive force for operating the flush control unit, the discharge valve and the rinse water supply valve is derived from the pressure difference between the aircraft cabin and the vacuum sewer 10, which must in any event be connected to the galley waste disposal system. Therefore, there is no need to route electric power to the galley waste disposal system.

In a modification of the system described above, the blower 18 does not maintain continuous vacuum in the vacuum sewer 10 in the event that the aircraft is at an altitude below 16,000 feet. In this case, the blower controller also receives a signal indicating whether any of the flushable appliances in the aircraft has generated a flush request and if the pressure difference signal indicates that the pressure difference between the vacuum sewer and the aircraft cabin is not sufficient to operate the vacuum sewer system, the blower controller issues a signal for starting operation of the blower. Operation of the blower rapidly increases the pressure difference between the vacuum sewer and the aircraft cabin (i.e. it increases the degree of partial vacuum in the vacuum sewer) to a sufficient level that the flush operation can be completed.

In the modified system, the tube 70 is connected not only to the sensor port of the flush control unit but also to a pressure switch 100, which closes when the pressure in the tube 70 increases to a sufficient extent to cause the flush control unit to initiate its operating sequence. When the switch 100 closes, it supplies a flush request signal to an electronic flush controller 104. The controller 104 supplies an electrical signal to the blower controller, which starts operation of the blower 18 unless the pressure difference is already sufficient for proper operation of the vacuum sewer system or the altitude switch has disabled the blower.

USPHS regulations prohibit fully automatic operation for an appliance connecting the galley to the vacuum sewer 10. However, if those regulations should be amended, it might be possible to omit the flush element 88.

Although the modified system described above requires that electric power be routed to the galley waste disposal system, the current needed to operate the electronic flush controller is much less than would be needed to operate a conventional electromechanical valve, such as a solenoid-operated valve, and so the capacity of the electric power connection can be much less than would be needed in the event that electromechanical valves were employed. Further, so long as there is adequate partial vacuum in the vacuum sewer 10, e.g. if the aircraft is above about 16,000 feet, the flush control unit 62 and the vacuum operated valves 54 and 84 will operate, regardless of whether the electronic flush controller receives operating current.

In the event of a failure of the flush control unit 62 shown in FIG. 1, the discharge valve 54 remains closed and there is a possibility of the galley being contaminated by waste backing up in the drain pipe 50.

Figure 2:
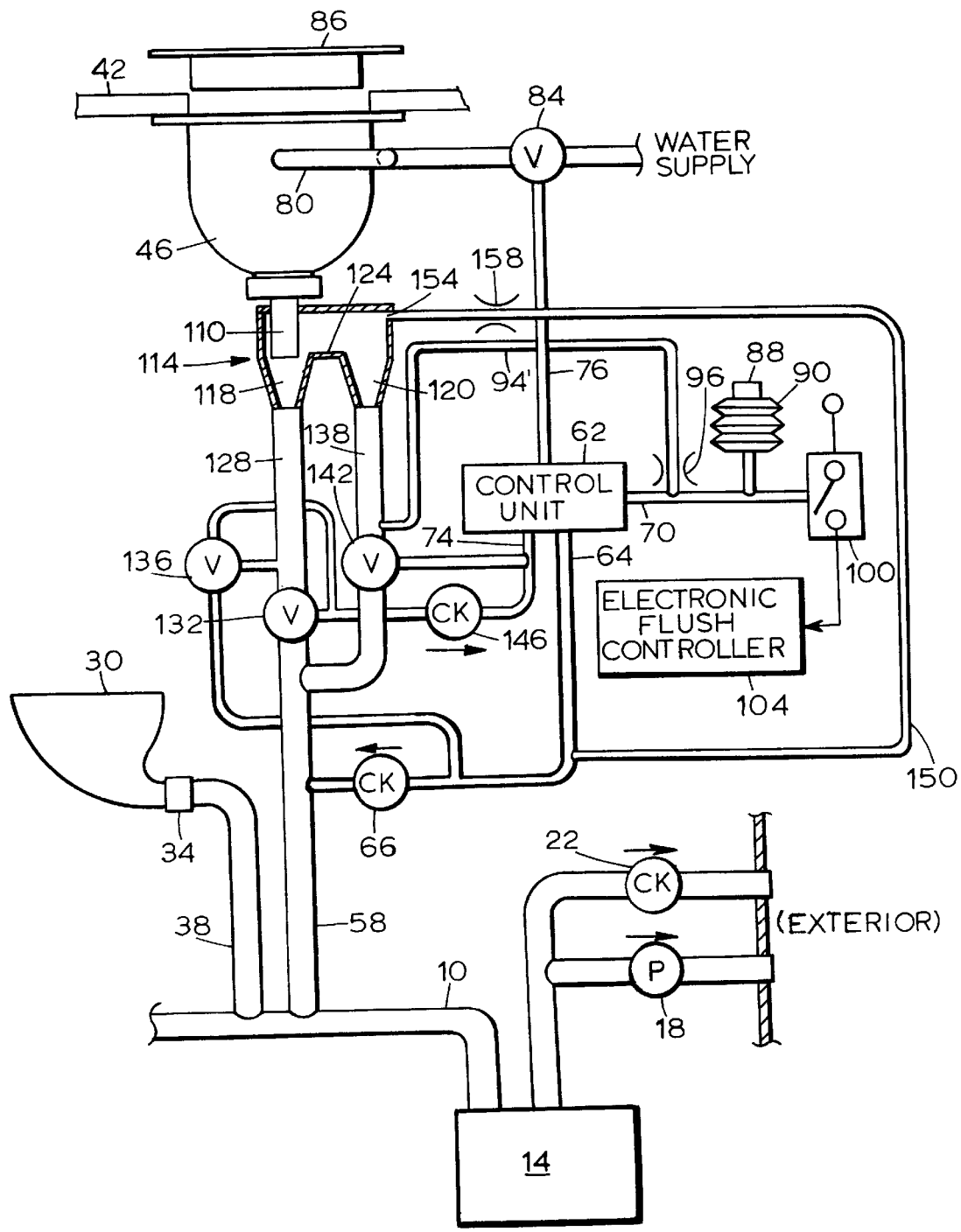
FIG. 2 is a partial schematic view of a passenger transport aircraft equipped with a second galley waste disposal system in accordance with the present invention.

The galley waste disposal system shown in FIG. 2 differs from the system shown in FIG. 1 by virtue of its having two parallel discharge valves. A tailpiece 110 projects downward from the basin 46 into a sealed waste collection receptacle 114 having a primary collection cavity 118 and a secondary collection cavity 120. Liquid in the primary cavity can pass to the secondary cavity if the level of liquid in the primary cavity reaches an overflow lip 124. The lower end of the tailpiece 110 is below the level of the overflow lip 124 so that liquid will not flow from the tailpiece to the secondary cavity 120 unless the primary cavity 118 is full to overflowing.

The primary cavity 118 is connected through an outlet pipe 128 and a primary discharge valve 132 to the branch line 58 of the vacuum sewer 10. The control port of the primary discharge valve 132 is connected to the tube 74 through a check valve 146. A normally-closed pressure sensor valve 136 is connected between the control port of the primary discharge valve 132 and the tube 64 and has its sensor port connected to the outlet pipe 128 just above the primary discharge valve 132. In the event that the pressure sensed by the pressure sensor valve 136 exceeds a predetermined threshold, typically corresponding to the primary receptacle being full approximately to the level of the overflow lip, the pressure sensor valve opens and connects the control port of the valve 132 to the tube 64, so that the valve 132 opens and the liquid upstream of the valve 132 is forced into the branch line 58.

The secondary cavity is connected to the branch line 58 through an outlet pipe 138 and a secondary discharge valve 142. The control port of the secondary discharge valve 142 is connected to the tube 74 downstream of the check valve 146. The purpose of the check valve 146 is to isolate the flush control unit from the valve 136 so that malfunction of the flush control unit will not vent partial vacuum communicated to the control port of the discharge valve 132 by the pressure sensor valve. When the flush control unit 62 executes its operating sequence in response to an increase in pressure at the sensor port of the flush control unit, both discharge valves 132 and 142 open and then close. Since both discharge valves 132 and 142 open in each operating sequence, the possibility of food waste accumulating in the secondary cavity 120 is reduced.

The backup sensor tube 94' is connected to the outlet pipe 138 just upstream of the valve 142.

The receptacle 114 will be cleaned from time to time to remove food waste, but there is nevertheless a possibility that food waste will accumulate in the receptacle between cleanings. Depending on the interval between cleanings, food waste in the receptacle 114 may decay, emitting a foul or unpleasant odor. In order to prevent odors passing from the receptacle 114 to the galley, a port 154 near the top of the receptacle is connected to the tube 64 through a tube 150. A continuous flow of air is drawn through the port 154 and the tube 150 into the tube 64, ensuring that there is a continuous flow of air into the receptacle 114 through the basin 46 and the tail piece 110. A throttle 158 allows a pressure difference between the receptacle 114 and the tube 64.

Since the system shown in FIG. 1 does not employ a reservoir or receptacle for temporarily holding food waste, there is little likelihood that waste would be trapped upstream of the valve 54 and accordingly there is no need for the port 154 and tube 150 in this case.

The system shown in FIG. 2 has an enhanced degree of protection against contamination of the galley by waste that has been deposited in the basin 46. Thus, the pressure sensor valve 136 protects against the possibility of failure of the control unit 62 and ensures reliable opening of the primary discharge valve 132 before an overflow condition is reached. The secondary discharge path, through the pipe 138 and the discharge valve 142, protects against failure of the primary discharge valve 132.

It will be appreciated that the invention is not restricted to the particular embodiment that has been described, and that variations may be made therein without departing from the scope of the invention as defined in the appended claims and equivalents thereof. For example, the invention is not restricted to use in a passenger aircraft since similar requirements exist in trains. Further, although it is preferred that the discharge valve(s), the rinse water supply and the flush control unit be operated by pressure difference between the aircraft cabin and the vacuum sewer, it would in principle be possible to use an electronic flush control unit and electrically operated valves, such as solenoid operated valves, instead.

I claim:

1. A galley waste collection system for a passenger transport vehicle having a vacuum sewage collection system including a sewage holding tank (14), a vacuum sewer (10), and a vacuum device (18, 22) for providing a substantial partial vacuum in the sewer pipe, the galley waste collection system comprising:

a basin (46) for receiving galley waste, the basin having an outlet opening, a normally-closed discharge valve (54; 132) connected between the outlet opening of the basin and the sewer pipe, the discharge valve being responsive to partial vacuum for opening the discharge valve a flush element (88) responsive to operation by a user of the galley waste collection system to issue a pneumatic discharge command, and a pneumatic control unit (62) adapted for fluid communication with the vacuum sewer and operable selectively in response to the pneumatic discharge command to place the discharge valve in fluid communication with the vacuum sewer thereby to open the discharge valve.

2. A galley waste collection system according to claim 1, wherein the flush element generates a pressure increase upon operation by the user and the pneumatic control unit is responsive to the pressure increase generated by the flush element.

3. A galley waste collection system according to claim 1, wherein the basin has an outlet pipe (50, 138) and a backup sensor tube (94, 94') is connected between the outlet pipe of the basin and the pneumatic control unit, the backup sensor tube having a length segment which extends upward from the connection of the backup sensor tube to the outlet pipe, whereby in the event that liquid accumulates upstream of the discharge valve, pressure in the backup sensor tube will increase, the pneumatic control unit being responsive to pressure in the backup sensor tube.

4. A galley waste collection system according to claim 1, including a normally-closed rinse water valve for supplying rinse water to the basin, the rinse water valve being responsive to partial vacuum for opening the rinse water valve, and wherein the pneumatic control unit is operable selectively in response to the discharge command to connect the rinse water valve to the sewer pipe for opening the rinse water valve.

5. A galley waste collection system according to claim 1, wherein the basin has an outlet pipe (128) and a backup sensor (136) is connected to the outlet pipe of the basin, the backup sensor including a normally-closed valve connected between the vacuum sewer and the discharge valve and operable in response to backup of liquid in the outlet pipe to connect the discharge valve to the vacuum sewer for opening the discharge valve.

6. A galley waste collection system for a passenger transport vehicle having a vacuum sewage collection system including a sewage holding tank (14), a vacuum sewer (10), and a vacuum device (18, 22) for providing a substantial partial vacuum in the sewer pipe, the galley waste collection system comprising:

a basin (46) for receiving galley waste, the basin having an outlet opening, a waste receptacle (114) for receiving waste from the outlet opening of the basin, the waste receptacle having a primary collection cavity (118) positioned for receiving waste from the outlet opening of the basin and also having a secondary collection cavity (120) which is separated from the primary collection cavity by an overflow barrier (124), a primary discharge valve (132) connected between the primary collection cavity of the waste receptacle and the sewer pipe, a secondary discharge valve (142) connected between the secondary collection cavity of the waste receptacle and the sewer pipe, and a control unit (62) responsive to a discharge command to open the primary discharge valve.

7. A galley waste collection system according to claim 6, comprising a backup sensor (136) operatively coupled to the primary collection cavity for sensing backup of liquid upstream of the primary discharge valve and providing a signal in response thereto, and wherein the primary discharge valve is responsive to an overflow signal from the backup sensor to open the primary discharge valve.

8. A galley waste collection system according to claim 6, wherein the primary collection cavity has an outlet pipe (128) and a backup sensor (136) is connected to the outlet pipe of the primary collection cavity, the backup sensor including a normally-closed valve connected between the vacuum sewer and the primary discharge valve and operable in response to backup of liquid in the outlet pipe of the primary collection cavity to connect the primary discharge valve to the vacuum sewer for opening the primary discharge valve.

9. A galley waste collection system according to claim 6, wherein the control unit is responsive to the discharge command to open both the primary discharge valve and the secondary discharge valve.

10. A galley waste collection system according to claim 6, further comprising a flush element (88) responsive to operation by a user of the galley waste collection system to issue a discharge command.

11. A galley waste collection system according to claim 6, comprising a backup sensor upstream of the primary discharge valve for detecting accumulation of liquid, the backup sensor being operatively coupled to the primary discharge valve for opening the primary discharge valve.

12. A galley waste collection system according to claim 6, comprising a backup sensor tube connected between the secondary collection cavity and the control unit.

13. A galley waste collection system according to claim 6, comprising an odor control pipe (68) connected between the sewer pipe and the waste receptacle for drawing a continuous flow of air from the waste receptacle.

14. A galley waste collection system for a passenger transport vehicle having a vacuum sewage collection system including a sewage holding tank (14), a sewer pipe (10), and a vacuum device (18, 22) for providing a substantial partial vacuum in the sewer pipe, the galley waste collection system comprising:

a basin (46) for receiving galley waste, the basin having an outlet opening, a waste receptacle (114) for receiving waste from the outlet opening of the basin, a discharge valve (132, 142) connected between the waste receptacle and the sewer pipe, a control unit (62) operable selectively in response to a discharge command to open the discharge valve, and an odor control pipe (150) connected between the sewer pipe and the waste receptacle for drawing a continuous flow of air from the waste receptacle.

* * * * *